(12) United States Patent
Kim et al.

(10) Patent No.: US 10,701,439 B2
(45) Date of Patent: Jun. 30, 2020

(54) ELECTRONIC APPARATUS AND CONTROLLING METHOD OF THEREOF

(71) Applicant: Samsung Electronics Co., Ltd., Suwon-si, Gyeonggi-do (KR)

(72) Inventors: Sungwon Kim, Suwon-si (KR); Youngjoon Yoo, Suwon-si (KR); Bongseok Lee, Suwon-si (KR); Heeran Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/240,110

(22) Filed: Jan. 4, 2019

(65) Prior Publication Data
US 2019/0208267 A1 Jul. 4, 2019

(30) Foreign Application Priority Data
Jan. 4, 2018 (KR) ........................ 10-2018-0001309

(51) Int. Cl.
*H04N 21/845* (2011.01)
*H04N 21/442* (2011.01)
(Continued)

(52) U.S. Cl.
CPC ... *H04N 21/44204* (2013.01); *G06Q 30/0264* (2013.01); *H04N 21/26241* (2013.01);
(Continued)

(58) Field of Classification Search
CPC ................................................ H04N 21/8545
See application file for complete search history.

(56) References Cited

U.S. PATENT DOCUMENTS

| 8,117,085 B1* | 2/2012 | Smith ................ G06Q 30/0629 705/26.7 |
| 9,715,901 B1* | 7/2017 | Singh ................... G11B 27/034 |
| 2010/0251290 A1* | 9/2010 | Kodialam .......... H04N 7/17318 725/34 |

(Continued)

FOREIGN PATENT DOCUMENTS

| JP | 2005-208896 | 8/2005 |
| JP | 2012-14236 | 1/2012 |

(Continued)

OTHER PUBLICATIONS

Olivier Chapelle et al., "Simple and Scalable Response Prediction for Display Advertising", ACM Transactions on Intelligent Systems and Technology, vol. 5, No. 4, Article 61, Dec. 2014, Association for Computing Machinery Corporation, New York, NY, XP058062393, ISSN: 2157-6904, DOI: 10.1145/2532128 (34 pages).

(Continued)

*Primary Examiner* — Michael H Hong
(74) *Attorney, Agent, or Firm* — Staas & Halsey LLP

(57) ABSTRACT

An electronic apparatus is provided. The electronic apparatus includes a memory configured to store usage state information on a pop-up content, and a processor configured to divide a time section based on interaction information of a user regarding the electronic apparatus, group the usage state information stored in the memory by each time section, predict or identify a usage pattern regarding a pop-up content by applying a different weighted value to each group, and identify whether to provide the pop-up content based on the predicted or identified usage pattern.

19 Claims, 14 Drawing Sheets

(51) Int. Cl.
| | |
|---|---|
| H04N 21/262 | (2011.01) |
| H04N 21/81 | (2011.01) |
| H04N 21/422 | (2011.01) |
| G06Q 30/02 | (2012.01) |
| H04N 21/466 | (2011.01) |

(52) U.S. Cl.
CPC . H04N 21/42203 (2013.01); H04N 21/44222 (2013.01); H04N 21/4667 (2013.01); H04N 21/812 (2013.01); H04N 21/8456 (2013.01)

(56) References Cited

U.S. PATENT DOCUMENTS

| | | |
|---|---|---|
| 2015/0256899 A1 | 9/2015 | Chand et al. |
| 2016/0345061 A1 | 11/2016 | Meoded et al. |
| 2017/0032245 A1 | 2/2017 | Osband et al. |
| 2019/0132645 A1* | 5/2019 | Kim ..................... H04N 21/454 |

FOREIGN PATENT DOCUMENTS

| | | |
|---|---|---|
| KR | 10-0685286 | 2/2007 |
| KR | 10-1480562 | 1/2015 |
| WO | WO 2017/004626 A1 | 1/2017 |

OTHER PUBLICATIONS

Extended European Search Report dated May 14, 2019 in corresponding European Patent Application No. 19150267.3.

Scott, Steven L., "Multi-armed bandit experiments" Analytics Help, Jun. 10, 2014, pp. 1-7, https://support.google.com/analytics/answer/2844870?hl=en.

Li, Lihong, et al., "A Contextual-Bandit Approach to Personalized News Article Recommendation", Proceedings of the 19th International Conference on World Wide Web, WWW'10, Apr. 26, 2010, 10 pgs.

White, John Myles, *Bandit Algorithms for Website Optimization*, Dec. 12, 2012, 87 pgs.

Schwarts, E.M. et al., "Customer Acquisition via Display Advertising Using Multi-Armed Bandit Experiments", *Marketing Science*, vol. 36 No. 4, Apr. 20, 2017, 69 pgs.

Zhang, Xinruo, et al. "A Bandit Approach to Price-Aware Energy Management in Cellular Networks", IEEE Communications Letters, vol. 21, No. 7, Mar. 27, 2017, pp. 1609-1612.

Hill, Daniel N., et al., "An Efficient Bandit Algorithm for Realtime Multivariate Optimization", *Proceedings of KDD '17*, Aug. 13-17, 2017, pp. 1813-1821.

Juliani, Arthur, "Simple Reinforcement Learning with Tensorflow Part 1.5: Contextual Bandits", Sep. 27, 2016, <https://medium.com/emergent-future/simple-reinforcement-learning-with-tensorflow-part-1-5-contextual-bandits-bff01d1aad9c> .

Gershoff, Matt, "Balancing Earning with Learning: Bandits and Adaptive Optimization", Sep. 23, 2012, <https://conductrics.com/balancing-earning-with-learning-bandits-and-adaptive-optimization/>.

Birkett, Alex "When to Run Bandit Tests Instead of A/B/n Tests", Sep. 14, 2015, <https://conversionxl.xom/blog/bandit-tests/>.

* cited by examiner

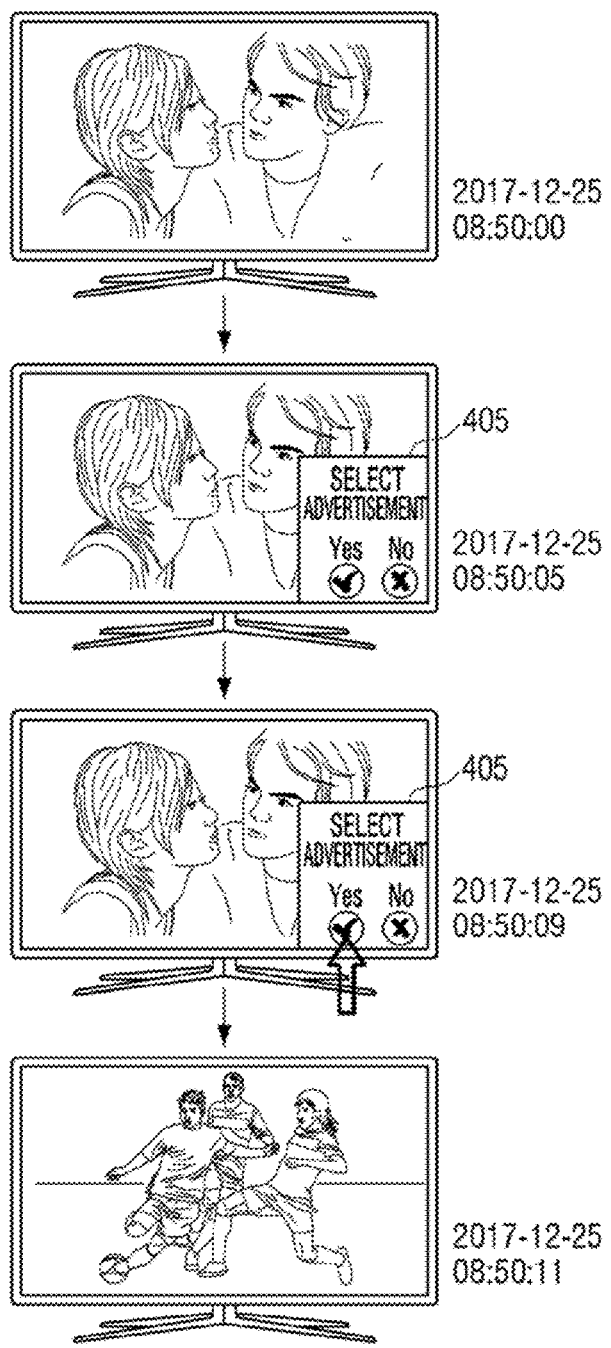

| USER | TIME POINT WHEN POP-UP IS PROVIDED | TIME POINT WHEN POP-UP IS SELECTED | WHETHER SELECTED |
|---|---|---|---|
| A | 20171225-06:50:05 | 20171225-06:50:08 | YES |
| A | 20171225-06:10:05 | 20171225-06:10:09 | NO |
| B | 20171225-20:50:05 | 20171225-20:50:08 | YES |
| B | 20171225-21:50:05 | 20171225-21:50:09 | YES |
| B | 20171225-21:10:05 | 20171225-21:10:09 | YES |
| B | 20171225-21:20:05 | 20171225-21:20:09 | YES |
| B | 20171225-21:30:05 | 20171225-21:30:08 | YES |
| A | 20171231-06:50:05 | 20171231-13:50:07 | YES |
| A | 20171231-06:10:05 | 20171231-14:10:15 | NO |
| A | 20171231-06:20:05 | 20171231-14:20:15 | NO |

| SORT OF POP-UP | TIME POINT WHEN POP-UP IS PROVIDED | TIME POINT WHEN POP-UP IS SELECTED | WHETHER SELECTED |
|---|---|---|---|
| ADVERTISEMENT | 20171225-06:50:05 | 20171225-06:50:08 | YES |
| ADVERTISEMENT | 20171225-06:10:05 | 20171225-06:10:09 | NO |
| RECOMMEND CONTENTS | 20171225-20:50:05 | 20171225-20:50:08 | YES |
| RECOMMEND CONTENTS | 20171225-21:50:05 | 20171225-21:50:09 | YES |
| RECOMMEND CONTENTS | 20171225-21:10:05 | 20171225-21:10:09 | YES |
| RECOMMEND CONTENTS | 20171225-21:20:05 | 20171225-21:20:09 | YES |
| RECOMMEND CONTENTS | 20171225-21:30:05 | 20171225-21:30:08 | YES |
| RECOMMEND CONTENTS | 20171231-06:50:05 | 20171231-13:50:07 | YES |
| RECOMMEND CONTENTS | 20171231-06:10:05 | 20171231-14:10:15 | NO |
| RECOMMEND CONTENTS | 20171231-06:20:05 | 20171231-14:20:15 | NO |

FIG. 12

| | | 0 | | 6 | | | 12 | | | 18 | | |
|---|---|---|---|---|---|---|---|---|---|---|---|---|
| 2017-12-04 | MON | #weather | | | | | | | | | #sports | |
| 2017-12-05 | TUE | #weather | | | | | | | #animation | | #sports | #sports |
| 2017-12-06 | Wed | #weather | | #news | | | | | #animation | #animation | #sports | |
| 2017-12-07 | Thu | #weather | | #news | | | | | #animation | | #sports | |
| 2017-12-08 | Fri | #weather | | | | | | #animation | | | #sports | |
| 2017-12-09 | Sat | | | | | | #movie | | #movie | #movie | #movie | |
| 2017-12-10 | Sun | | | | | | #movie | | #movie | #movie | | |
| 2017-12-11 | MON | #weather | | #news | | | | | #animation | | #sports | |
| 2017-12-12 | TUE | #weather | | #news | | | | | #animation | #animation | #sports | |
| 2017-12-13 | Wed | #weather | | #news | | | | | #animation | | #sports | |
| 2017-12-14 | Thu | #weather | | | | | | | #animation | | #sports | #sports |
| 2017-12-15 | Fri | #drama | | #drama | | | | #drama | | | #drama | #drama |
| 2017-12-16 | Sat | #drama | | | | #movie | | #movie | #drama | #movie | #movie | #movie |
| 2017-12-17 | Sun | #drama | | | | | | #drama | #drama | #movie | #movie | | ial
ELECTRONIC APPARATUS AND CONTROLLING METHOD OF THEREOF

CROSS-REFERENCE TO RELATED APPLICATION(S)

This application is based on and claims priority under 35 U.S.C. 119 to Korean Patent Application No. 10-2018-0001309, filed on Jan. 4, 2018 in the Korean Intellectual Property Office, the disclosure of which is herein incorporated by reference in its entirety.

BACKGROUND

Field

The disclosure relates to an electronic apparatus and a controlling method thereof, and more particularly, to an electronic apparatus that operates by predicting or determining a usage pattern of a user, and a controlling method thereof.

Description of Related Art

The operation that a user uses an electronic apparatus may be stored in a memory and the pattern of the operation that the user uses the electronic apparatus may be analyzed by comparing a plurality of pieces of stored data.

For example, if a user repeats watching news at 8:00 PM on every Monday more than three times, an electronic apparatus may generate the pattern that the user watches news at 8:00 PM on every Monday. In addition, the electronic apparatus may perform an operation for changing a channel to the news channel at 8:00 PM on every Monday.

As the example described above, repeating operations of a user can be a selection pattern of the user, and an electronic apparatus can analyze the selection pattern of the user.

The electronic apparatus may analyze the selection pattern of the user and predict or determine the next selection operation of the user.

However, if the selection pattern of the user is not constant, the electronic apparatus cannot predict or determine the selection operation of the user accurately. This is because the user's recent data and the user's old data are calculated with the same weighted value, without considering a time.

Accordingly, in the embodiment, different weighted values are applied based on a time, that is, a high weighted value is applied to the recent usage data and a low weighted value is applied to the old usage data, so as to predict or determine the selection operation of a user more accurately.

However, also in this case, the usage data of a user is individually calculated, and thus, there has been a problem that the recent usage history is not accurately reflected.

SUMMARY

According to an embodiment of the disclosure, it is provided an electronic apparatus that identifies a usage pattern of a user by applying different weighted values to user's usage state information for each time section divided based on user's interaction information, and a controlling method thereof.

According to an embodiment, there is provided an electronic apparatus including a memory configured to store usage state information on a pop-up content, and a processor configured to divide a period which a plurality of interaction information of a user are identified, into time sections based on interaction information of a user regarding the electronic apparatus, group the usage state information stored in the memory by each time section, determine(identify) a usage pattern regarding the pop-up content by applying a different weighted value to each group, and identify whether to provide the pop-up content based on the determined(identified) usage pattern.

In this case, the processor may apply a high weighted value to the usage state information included in a group corresponding to a time section nearest to a present time point.

Here, the usage state information may include at least one of information on whether the pop-up content is selected or information on a time from a time point when the pop-up content is provided to a time point when whether the pop-up content is selected is identified.

The interaction information may include at least one of a user interaction for turning on/off the electronic apparatus, a user interaction for selecting a specific menu, a user interaction for pressing a predetermined button or a user interaction for inputting a voice command.

The processor may divide the period into the time sections based on at least one of a time point when the user interaction is input or a time point when the user interaction is terminated.

The processor may group usage state information selected based on user information from the usage state information stored in the memory, by the each time section.

The processor may identify a user who uses the electronic apparatus based on at least one of a repeating pattern of a viewing time or a genre pattern of a viewing content, and determine a usage pattern of each user based on interaction information of each user who is identified.

The pop-up content may include at least one of a recommended pop-up content or an advertisement pop-up content, and the processor may determine a usage pattern for each type of the pop-up content based on information for each type of the pop-up content.

The pop-up content may be a recommended pop-up content, and the processor may determine a usage pattern of each recommended target of the pop-up content based on information on a recommended target of the recommended pop-up content.

The processor may determine the usage pattern by combining usage state information on each group to which the different weighted value is applied.

According to an embodiment, there is provided a controlling method of an electronic apparatus including storing usage state information on a pop-up content, dividing a period which a plurality of interaction information of a user are identified, into time sections based on interaction information of a user regarding the electronic apparatus, grouping the usage state information by each time section, and determining a usage pattern regarding the pop-up content by applying a different weighted value to each group, and identifying whether to provide the pop-up content based on the determined usage pattern.

In this case, the determining a usage pattern regarding a pop-up content including applying a high weighted value to the usage state information included in a group corresponding to a time section nearest to a present time point.

The usage state information may include at least one of information on whether the pop-up content is selected or information on a time from a time point when the pop-up content is provided to a time point when whether the pop-up content is selected is identified.

The interaction information may include at least one of a user interaction for turning on/off the electronic apparatus, a user interaction for selecting a specific menu, a user interaction for pressing a predetermined button or a user interaction for inputting a voice command, and the dividing may include dividing the period into the time sections based on at least one of a time point when the user interaction is input or a time point when the user interaction is terminated.

The determining a usage pattern regarding a pop-up content may include grouping usage state information selected based on user information from the stored usage state information, by the each time section.

The determining a usage pattern regarding a pop-up content may include identifying a user who uses the electronic apparatus based on at least one of a repeating pattern of a viewing time or a genre pattern of a viewing content, and determining a usage pattern of each user based on interaction information of each user who is identified.

The pop-up content may include at least one of a recommended pop-up content or an advertisement pop-up content, and the determining a usage pattern regarding a pop-up content may include determining a usage pattern for each type of the pop-up content based on information for each type of the pop-up content.

The pop-up content may be a recommended pop-up content, and the determining a usage pattern regarding a pop-up content may include determining a usage pattern of each recommended target of the pop-up content based on information on a recommended target of the recommended pop-up content.

The determining a usage pattern regarding a pop-up content may include determining the usage pattern by combining usage state information on each group to which the different weighted value is applied.

According to an embodiment, there is provided a computer readable recording medium which includes a program to execute a method for controlling an electronic apparatus, wherein the controlling method includes storing usage state information on a pop-up content, dividing a period which a plurality of interaction information of a user are identified, into the time sections based on interaction information of a user regarding the electronic apparatus, grouping the usage state information by each time section, and determining a usage pattern regarding a pop-up content by applying a different weighted value to each group, and identifying whether to provide the pop-up content based on the determined usage pattern.

BRIEF DESCRIPTION OF THE DRAWINGS

FIGS. 5A and 5B are a view illustrating a process for storing usage state information on a content according to an embodiment of the disclosure;

FIG. 12 is a view illustrating an operation for identifying a user by using user's viewing time and genre pattern of a content;

DETAILED DESCRIPTION

Figure 1:
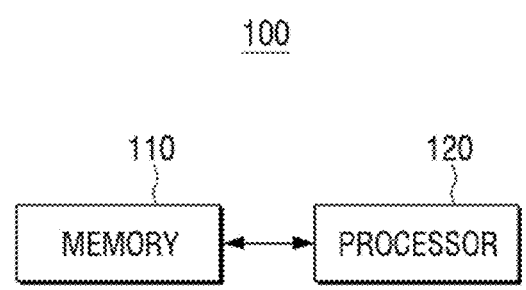
FIG. 1 is a block diagram illustrating an electronic apparatus according to an embodiment of the disclosure.

Before specifically describing the disclosure, a method for demonstrating the embodiments and drawings will be described.

With respect to the terms used in an embodiment of the disclosure, general terms currently widely used are selected in view of function with respect to the disclosure. However, these terms may vary depending on intention, legal or technical interpretation, emergence of new technologies, and the like of those skilled in the related art. Also, there may be some terms arbitrarily selected by an applicant. Such terms may be construed according to meanings defined in the disclosure, and may also be construed based on general contents of the disclosure and a typical technical concept in the art unless the terms are not specifically defined.

Also, the same reference numerals or symbols described in the attached drawings denote parts or elements that actually perform the same functions. For convenience of descriptions and understanding, the same reference numerals or symbols are used and described in different embodiments. In other words, although elements having the same reference numerals are all illustrated in a plurality of drawings, the plurality of drawings do not mean one embodiment.

In addition, in order to distinguish between the components, terms including an ordinal number such as "first", "second", etc. may be used in the disclosure and claims. The ordinal numbers are used in order to distinguish the same or similar elements from one another, and the use of the ordinal number should not be understood as limiting the meaning of the terms. For example, used orders, arrangement orders, or the like of elements that are combined with these ordinal numbers may not be limited by the numbers. The respective ordinal numbers are interchangeably used, if necessary.

The singular expression also includes the plural meaning as long as it does not differently mean in the context. The terms, "include", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof.

The disclosure may have several embodiments, and the embodiments may be modified variously. In the following description, specific embodiments are provided with accompanying drawings and detailed descriptions thereof. However, it is to be understood that the disclosure is not limited to a specific embodiment, but includes all modifications, equivalents, and substitutions without departing from the scope and spirit of the disclosure. While describing embodiments, if it is determined(identified) that the specific description regarding a known technology obscures the gist of the disclosure, the specific description is omitted.

The terms such as "first," "second," and so on may be used to describe a variety of elements, but the elements should not be limited by these terms. The terms are used simply to distinguish one element from other elements.

The terms used herein are solely intended to explain a specific embodiment, and not to limit the scope of the disclosure. The singular expression also includes the plural meaning as long as it does not differently mean in the context. The terms, "include", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof.

In the embodiment of the disclosure, the term "module," "unit," or "part" is referred to as an element that performs at least one function or operation, and may be implemented with hardware, software, or a combination of hardware and software. In addition, a plurality of "modules", "units", "parts", or the like may be integrated into at least one module or chip and may be implemented in at least one processor, except for a case in which they need to be each implemented in individual specific hardware.

Also, when any part is connected to another part, this includes a direct connection and an indirect connection through another medium. Further, when a certain portion includes a certain element, unless specified to the contrary, this means that another element may be additionally included, rather than precluding another element.

FIG. 1 is a block diagram illustrating an electronic apparatus according to an embodiment.

Referring to FIG. 1, an electronic apparatus 100 may be composed of a memory 110 and a processor 120.

Here, the electronic apparatus 100 may be implemented as various apparatuses such as a TV, a set top box, a smart phone, a smart watch, etc. For example, the electronic apparatus 100 may be implemented as, for example, an analog TV, a digital TV, a 3D-TV, a smart TV, an LED-TV, an OLED TV, a plasma TV, a monitor, a curved TV having a screen of a fixed curvature, a flexible TV having a screen of a fixed curvature, a bended TV having a screen of a fixed curvature, and/or a curvature variable TV having a current screen of a curvature that may be changed by a received user input, etc., but it is not limited thereto.

The memory 110 is a space storing data. The memory 110 may store information related to a viewing history of an electronic apparatus 100. In addition, the memory 110 may store advertisement information, etc., and the data in which the information related to the viewing history, the advertisement information, etc. are analyzed. The stored information may include an on/off time of the electronic apparatus 100, a viewing history (a channel, a title, additional information of a program, etc.), an App execution history and an input history such as a remote controller input, a voice input, etc., and a function usage history (a menu, etc.), and may include information on the usage time point. The stored information may be deleted when a predetermine time passes, but a storage maintenance time may vary based on a degree of importance, etc. of the information.

The memory 110 may store various application programs, data, and software modules for driving and controlling the electronic apparatus 100 by a control of the processor 120. For example, the memory 110 may include a history storing/analyzing module which stores a usage history of a content provided by the electronic apparatus 100, a curator module which selects a preferred content, a content exposure module which provides the information on the selected preferred content, a voice recognition module, and an image recognition module, and the like.

The information on the usage history of a content may include, for example, an on/off time of the electronic apparatus 100, a usage history of a content, input information (a remote controller, a voice, etc.), a function usage history (a menu selection history, etc.), etc. The memory 110 may store the history information by day and by time for each of at least one content provided by the electronic apparatus 100. The memory 110 may store only the history information by day and store only the history information by time. Specifically, the history information may include the information on when a specific content is used (date and time) and how long the content is used (used time). The history information may be updated by adding a new history as a user uses the content.

Here, the content may be a broadcasting channel, a broadcasting content (e.g., a Video on Demand (VoD), or a streaming content (an image, a music, etc.)), or a plurality of applications, functions, etc. that may be executed in the electronic apparatus 100. That is, the history information may include the information on when a specific broadcasting channel is viewed and how long the channel is viewed, and the information on when a specific application is used and how long the application is used, and the information on when a specific content is reproduced and how long the content is reproduced. It is not limited to the above examples, and various pieces of history information may be stored in the memory 110 according to what content the electronic apparatus 100 provides.

The memory 110 may be implemented as a non-volatile memory, a volatile memory, a flash memory, a hard disk drive (HDD) or a solid state drive (SDD). The memory 110 may be implemented as a storing medium in the electronic apparatus 100 or as an external storing medium, for example, a micro SD card, a USB memory, a web server via network, etc.

The processor 120 may control an overall operation of the electronic apparatus 100.

According to an embodiment, the processor 120 may include one or more of a digital signal processor (DSP), a microprocessor, a Time controller (TCON), a central processing unit (CPU), a Micro Controller Unit (MCU), a micro processing unit (MPU), a controller, an application processor (AP), a communication processor (CP), or an ARM processor, and may be defined as the corresponding term. In addition, the processor 120 may be implemented as a System on Chip (SoC) or a large scale integration (LSI) in which a processing algorithm is embedded, or implemented in a form of a Field Programmable gate array (FPGA).

The processor 120 may store the usage state information on a pop-up content in the memory 110. In addition, according to an embodiment, the weighted value to be stored in the usage state information may be calculated based on the predetermined formula, an algorithm, and the like. However, according to circumstances, the corresponding weighted value may be stored in the memory 110 in advance. Here, the pre-stored weighted value may be calculated by an experiment, a formula, an algorithm, etc.

The pop-up content is a content for providing information to a user as a pop-up window or interacting with a user. For example, the pop-up content may include as least one of an advertisement pop-up content and a recommended pop-up content.

The advertisement pop-up content may be a content providing information on a specific advertisement to a user, and asking the user whether to select moving to the page for watching the detailed information of the corresponding advertisement. The recommended pop-up content may be a content providing information on a specific recommended content to a user or asking the user whether to select moving to the page for providing detailed information on the recommended content or for executing the recommended content. For example, when a user is watching a specific advertisement, an advertisement pop-up content may be the content for confirming whether to purchase the product shown in the corresponding advertisement, or the content for moving to the page informing detailed information on the specific advertisement according to the selection of the user by being linked to the corresponding page.

The usage state information may include at least one of information on whether the pop-up content is selected or information on a time from a time point when the pop-up content is provided to a time point when whether the pop-up content is selected is identified.

With regard to whether a user selects the pop-up content, a response of a user may be a selection, a close (exit), or a non-response. If the pop-up content is provided, there may be a case of transmitting a command so that a user uses the pop-up content, a case of transmitting a command for removing the specific UI that displays the pop-up content, and a case in which there is no response regarding the pop-up content. In this case, the processor 120 may control to remove the specific UI in which the pop-up content is displayed if there is no response on the pop-up content, after a predetermined time passes. In addition, if there is no response regarding the pop-up content, it may be determined that this is the same as the close (exit) operation in which the pop-up content is not used. The processor 120 may identify the response of the user regarding the pop-up content and store the identification result and an identified time point in the memory.

Meanwhile, the processor 120 may divide a time section for grouping the usage state information based on the interaction information of a user regarding the electronic apparatus 100. The processor 120 may divide a period which a plurality of interaction information of a user are identified, into time sections based on interaction information of a user regarding the electronic apparatus. And the period may be period including pre-determined range. For example, the pre-determined range may be a period from the power-on time of the electronic apparatus 100 to the power-off time of the the electronic apparatus 100. In addition, the pre-determined range may be from 8 AM to 11 PM.

In this case, the user interaction information may correspond to one operation of a user for manipulating the electronic apparatus 100.

Specifically, the user interaction information may include at least one of a user interaction for turning on/off the electronic apparatus 100, a user interaction for selecting a specific menu, a user interaction for pressing a predetermined button or a user interaction for inputting a voice command. The above example is merely for describing the user interaction, and does not limit the type of the user interaction of an embodiment.

The user interaction may mean a specific operation of a user for manipulating the electronic apparatus 100. In this case, the user may set the operation of turning on/off the electronic apparatus 100 as the user interaction.

The processor 120 may divide the time section based on at least one of a time point when the user interaction is input or a time point when the user interaction is terminated.

In this case, the processor 120 may divide the section from the time point when a user turns on the electronic apparatus 100 to the time point when the user turns off the electronic apparatus 100, as one time section.

In addition, the processor 120 may divide the section from the time point when the user selects a specific menu to the time point when the user exits from the specific menu, as one time section.

Also, the processor 120 may divide the section from the time point when the user presses a predetermine button to the time point when the user presses the predetermine button again, as one time section.

In addition, the processor 120 may divide the section from the time point when the user inputs a predetermined voice command to the time point when the user inputs the predetermined voice command again, as one time section.

Specifically, a user may receive a voice of the user through a microphone included in the electronic apparatus 100. The electronic apparatus 100 may receive the user voice and determine the voice as the input of the user.

For example, from the time point when a user uses a voice recognition function to the time point when the user terminates the voice recognition function may be divided as one time section. If a user inputs the sound "Samsung voice start" as a voice, the processor 120 may determine that the user performs the voice recognition function. In addition, if the user inputs the sound "Samsung voice end" as a voice, the processor 120 may determine that the user terminates the voice recognition function.

In this case, the processor 120 may divide the section from the time point when "Samsung voice start" is input as a voice to the time point when "Samsung voice end" is input as a voice, as one time section.

Meanwhile, in the voice input method according to another embodiment, the time section may be divided based on the mention of a specific function. In detail, the function corresponding to the user's interaction may be realized by a voice input in addition to pressing a physical button.

For example, if a user interaction is to turning on/off the electronic apparatus, when the user inputs "turn on/off" as a voice, the electronic apparatus may response in the same way as the case where the physical button is pressed.

In the same manner, if the voice that controls to execute a specific menu or a specific function is input, the processor 120 may divide the usage section based on the user interaction (executing a specific menu or a specific function) corresponding to the received voice.

Meanwhile, the operation of dividing the user interaction described above is merely for a description, and in the implementation, the user interaction may be divided by various methods. For example, the section from the time point when a user turns on the electronic apparatus 100 to the time point when the user presses a predetermined button may be divided as one time section, and the section may be combined in various ways.

In addition, a starting point that specifies the time section is set as the time point when the user interaction is performed, but an ending point thereof may be limited to the case in which a predetermined time passes. For example, from the time point when a user selects a specific menu to the time point when ten minutes passes may be divided as one time section. In the above description, from the time point when a specific menu is selected to the time point when ten minutes passes is described as one section, but various user interactions in addition to the specific menu may be set and the time of ten minutes may vary according to the setting of a user.

Meanwhile, the processor 120 may group the usage state information stored in the memory 110 into each time section. The processor 120 may store the usage state information in the memory as a plurality of pieces of data. In this case, the usage state information may include time information. For example, the processor 120 may store the time when a pop-up content is displayed or the time when the selection operation of a user regarding the pop-up content is identified in the memory 120.

The processor 120 may group the usage state information according to the above described time section based on the time information included in the usage state information. For example, the processor 120 may group the usage state information stored in the memory 120 from the time point when the user turns on the electronic apparatus 100 to the time point when the user turns off the electronic apparatus 100 as one group. In addition, suppose that a user turns off the power of the electronic apparatus 100 and turns on the power of the electronic apparatus 100 after a day. In this case, the processor 120 may group the usage state information stored in the memory 120 from the time point when the user turns on the electronic apparatus 100 to the time point when the user turns off the electronic apparatus 100, as a new group.

That is, the processor 120 may group the usage state information by generating a new group every time when the electronic apparatus 100 is turned on.

Meanwhile, the processor 120 may group the usage state information selected based on the user information from the usage state information stored in the memory 110, into each time section. The user information may mean the information on a plurality of users who use the electronic apparatus 100.

The user information may correspond to various user's viewing patterns such as a viewing time, a viewing content genre, a viewing day, etc.

In this case, the processor 120 may group the usage state information differently for each user based on the user information. For example, suppose that a specific user uses the electronic apparatus 100 from 6:00 PM to 12:00 PM. The processor 120 may group the usage state information from 6:00 PM to 12:00 PM only, using the time information included in the usage state information.

That is, the processor 120 may performs grouping by using individual information of the user stored in the memory 120. In addition, in the above description, the example of the user's individual information has been described as a usage time. However, this is merely an example and in addition to the usage time, the user's individual information may be a content genre or a channel preferred or not preferred by a user, and various pieces of data which may reflect the individual usage pattern of a user can be user's information.

Meanwhile, the processor 120 may predict or determine the usage pattern regarding the pop-up content by applying different weighted values to each group. The processor 120 may apply different weighted values to each group which is divided based on the above described time section.

In this case, the processor 120 may apply a relatively high weighted value to the usage state information included in the group corresponding to the time section nearest to the present time point.

The group corresponding to the time section nearest to the present time point reflects a relatively recent usage pattern of a user and thus, this group may be used as more accurate data for predicting or determining the usage pattern of the user. For example, weighted value r may be applied to the usage state information included in the first group, weighted value ^2 may be applied to the usage state information included in the second group, and weighted value r^3 may be applied to the usage state information included in the third group.

In addition, the processor 120 may predict or determine (identify) the usage pattern by combining the usage state information on each group to which the different weighted values are applied, for each of the usage states. The values of the first, second, and third groups to which different weighted values are applied, described above, are combined and based on the combination result, the usage pattern of the user may be predicted or determined.

The processor 120 may predict or determine whether a user is going to use a pop-up content by using the above described combination result. Specifically, the processor 120 may compare the specific value using the combined result and the predetermined value, and if the specific value is bigger or smaller than the predetermined value, the processor 120 may control to perform the corresponding operation. For example, if the specific value of the combination result is bigger than the predetermined value, the processor 120 may control to provide the pop-up content to the user.

Meanwhile, the processor 120 may identify a user who uses the electronic apparatus 100 based on at least one of a repeating pattern of a viewing time or a genre pattern of a viewing content, and predict or determine a usage pattern of each user based on interaction information of each user who is identified.

The processor 120 may analyze the time when the user repeatedly uses the electronic apparatus 100 and identify the user. In addition, the processor 120 may analyze the time and genre of the content repeatedly used by a user, which is provided by the electronic apparatus 100, and identify the user.

In this case, the processor 120 may set a different user interaction for each user. For example, if the processor 120 recognizes a user as A, the processor 120 may set the user interaction as a power on/off operation of the electronic apparatus 100, and a time may be divided based on the power on/off operation of the electronic apparatus 100. If the processor 120 recognizes a user as B, the processor 120 may set the user interaction as an operation for selecting a specific menu, and a time may be divided based on the operation for selecting the specific menu.

If the user interaction is divided by each user, the electronic apparatus 100 may predict or determine the usage pattern of a user more accurately because it is possible to perform a different prediction for each user, not that the prediction is generally performed for a pop-up content. Meanwhile, it has been described that the user's usage pattern is predicted or determined for each user. However, the user's usage pattern may be predicted or determined differently for each pop-up content in addition to being predicted or determined differently for each user.

Meanwhile, the pop-up content may include at least one of a recommended pop-up content or an advertisement pop-up content.

The pop-up content may be a content asking a user whether to select a specific advertisement, or may be a content recommending a specific content. For example, the pop-up content may be a content for confirming whether to purchase a product shown in a specific advertisement or a content for moving the current page to the page informing detailed information on the specific advertisement, when a user is watching the corresponding advertisement. In addition, the pop-up content may be a content for recommending a specific content by analyzing the viewing history of the user.

The processor 120 may predict or determine the usage pattern for each type of the pop-up content based on the information on each type of the pop-up content. For example, if a pop-up content is regarding an advertisement, the processor 120 may group the usage state information for each pop-up content regarding the advertisement and predict or determine the user's usage pattern.

In addition, in the case of a recommended pop-up content, the processor 120 may predict or determine the usage pattern of each recommended target of the pop-up content based on information on the recommended target of the recommended pop-up content. The information on the recommended target may be the information on the recommended target and the recommended target may be a specific content (a channel or a program).

In addition, the recommended target may be a guide informing a specific operation to a user. For example, it may be a guide for setting up the electronic apparatus 100 or a guide for describing the function of the electronic apparatus 100 to a user.

In addition, the recommended target may be regarding the method for recommending a content to a user. For example, the information on the selection method regarding a linear program or a non-linear program may be set as a recommended pop-up content.

In this case, the processor 120 may divide the usage state information for each recommended target from various types of pop-up contents, and predict or determine the usage pattern of a user for each recommended target. Accordingly, the usage pattern of a user may be accurately predicted or determined by using the subdivided data.

As described above, the processor 120 may predict or determine the usage pattern of a user accurately because the processor 120 may group the usage state information according to a user, a type of the pop-up content, and a target of the pop-up content, and may perform prediction using each pieces of data.

In addition, the processor 120 may identify whether to provide the pop-up content based on the predicted or determined usage pattern. For example, if it is predicted or determined that a user will use a pop-up content, the processor 120 may provide the pop-up content to the user, and if it is predicted or determined that a user will not use the pop-up content, the processor 120 may not provide the pop-up content to the user.

Meanwhile, the processor 120 may vary the time point when whether to provide the pop-up content is determined. For example, the processor 120 may provide a pop-up content on every predetermined time and may provide the pop-up content only in a predetermined event. In this case, the processor 120 may repeatedly perform the above predicted or determined operation every time when the pop-up content is provided.

In addition, the processor 120 may perform an operation for identifying whether to provide the pop-up content only for one time when the power of the electronic apparatus 100 is newly turned on, and maintain the same result until the power of the electronic apparatus 100 is turned off. For example, if it is identified not to provide the pop-up content for one time, the processor 120 may control not to provide the pop-up content until the power of the electronic apparatus 100 is turned off.

The electronic apparatus 100 according to an embodiment may divide the time section based on the interaction information of the user and group the usage state information stored in the memory 120 into each time section, and thus, the usage pattern of the user may be divided significantly. In addition, the electronic apparatus 100 may predict or determine the usage pattern of the pop-up content by applying different weighted values to each group, and thus, the data may be divided significantly and different weighted values may be applied to the divided data by each group. According thereto, the electronic apparatus 100 may predict or determine the user's usage pattern accurately.

Meanwhile, it has been described that the subject that analyzes the usage pattern of a user is the processor 120 of the electronic apparatus 100, but, the analysis may be performed in an external server. For example, the electronic apparatus 100 may transmit the usage state information and the viewing history information to an external server, and the external server may perform an operation for predicting or determining the usage pattern of the user. In addition, the external server may predict or determine the usage pattern of the user in the electronic apparatus 100 and transmit the corresponding information to the electronic apparatus 100.

Specifically, the electronic apparatus 100 may transmit data to an external server or receive data from the external server. In this case, the electronic apparatus 100 may use a wireless or a wired communication method in order to communicate with the external server.

Meanwhile, the electronic apparatus 100 may communicate with an external server and an external apparatus at the same time. Specifically, the electronic apparatus 100 may receive data from an external apparatus and transmit the data to an external server. In this case, the communicator 130 of the electronic apparatus 100 that communicates with the external apparatus and the external server may be composed as one module. One module may be Wi-Fi. The communicator 130 may includes circuitry.

Meanwhile, the communicator 130 of the electronic apparatus 100 may be composed of a plurality of modules and communications may be performed with the external apparatus or the external server using different communicators. For example, the communication with the external apparatus may be performed by using a Bluetooth module, and the communication with the external server may be performed by using an Ethernet modem or a Wi-Fi module.

Meanwhile, a brief configuration of the electronic apparatus 100 has been illustrated and described in the above, but various configurations may be additionally included in an implementation. This will be illustrated below with reference to FIG. 2.

Figure 2:
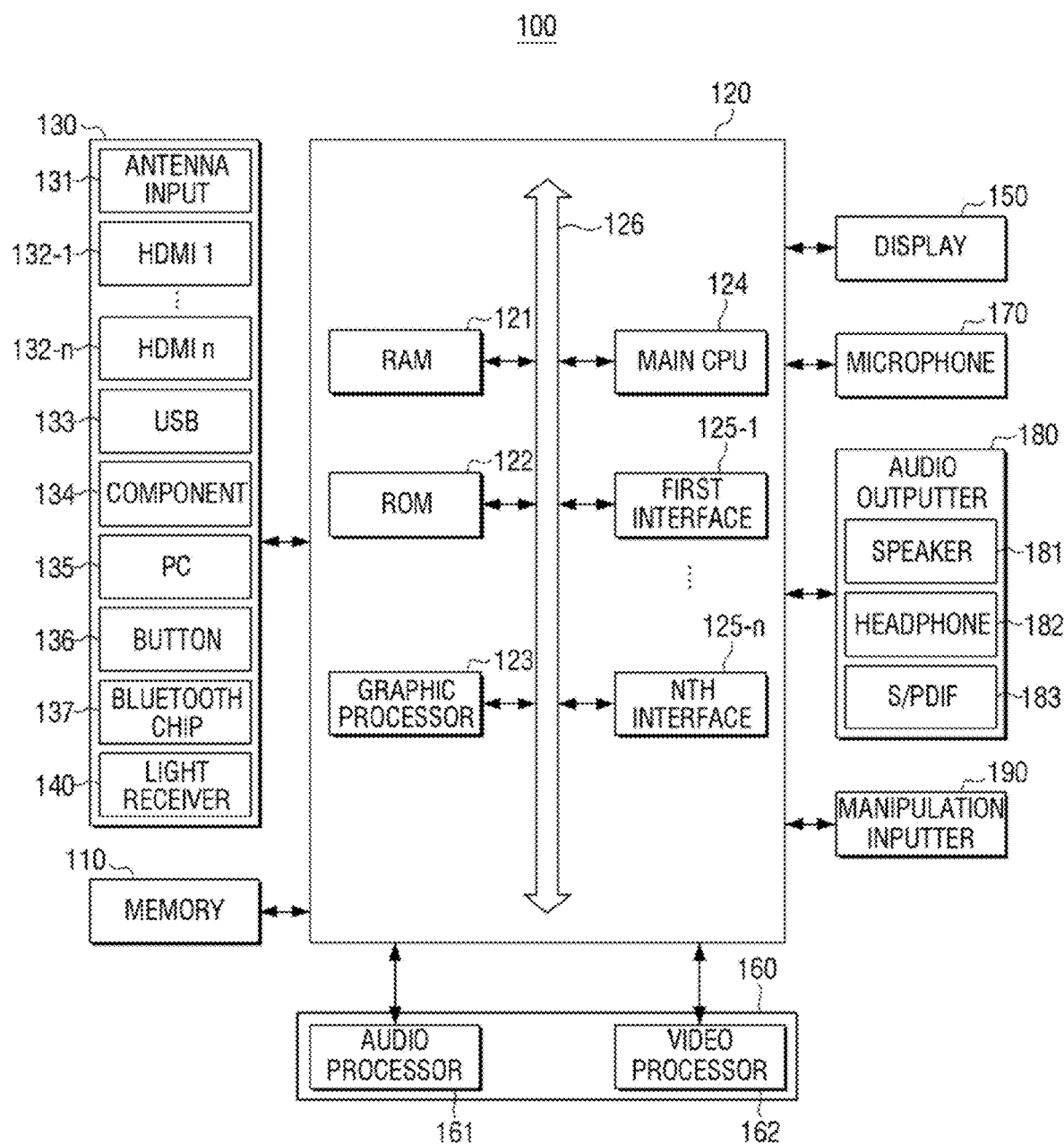
FIG. 2 is a block diagram illustrating an electronic apparatus of FIG. 1 in detail.

FIG. 2 is a block diagram illustrating an electronic apparatus of FIG. 1 in detail.

Referring to FIG. 2, the electronic apparatus 100 may further include a light receiver 140, a display 150, a signal processor 160, an audio outputter 180, etc. in addition to the communicator 130, the memory 110, and the processor 120.

Among the operations of the communicator 130, the memory 110, and the processor 120, the operation same as the operation described above will be omitted.

The communicator 130 may include an antenna input port 131, a High-Definition Multimedia Interface (HDMI) input port 1~n 132-1 to 132-n, a USB port 133, a component input jack 134, a PC input port 135, a button 136, a Bluetooth chip 137, a light receiver 140 and the like.

The communicator 130 may include a communication chip such as a Bluetooth chip 137. Although not illustrated, the communicator 130 may include various communication chips such as a Wi-Fi chip, a Near Field Communication (NFC) chip, a wireless communication chip, etc. When using the Bluetooth chip 137, various pieces of connection information such as an SID and a session key are received or transmitted first, and the communication connection is performed by using the connection information, and then various pieces of information may be received or transmitted.

The communicator 130 may include various communication modules such as a near field wireless communication module (not illustrated) and a wireless communication module (not illustrated). The near field wireless communication module is a module for communicating with the external apparatus 200 at a short distance based on the near field wireless communication method such as a Bluetooth (BT), a Bluetooth Low Energy (BLE), a ZigBee method, etc. In addition, the wireless communication module is a module that performs communication by being connected to the external network based on the wireless communication protocol such as a Wi-Fi, IEEE, etc. In addition, the wireless communication module may further include the mobile communication module that accesses a mobile network and performs communication according to various mobile communication standards such as a 3rd Generation (3G), a 3rd Generation Partnership Project (3GPP), a Long Term Evolution (LTE), and an LTE Advanced (LTE-A).

The electronic apparatus 100 may include a tuner (not illustrated) for seeking a broadcasting channel received through an antenna input port 131.

The processor 120 may control an overall operation of the electronic apparatus 100 using various programs stored in the memory 110.

The processor 120 may include a random access memory (RAM) 121, a read only memory (ROM) 122, a graphic processor 123, a main central processing unit (CPU) 124, a first to n-th interface 125-1 to 125-n, and a bus 126. Here, the RAM 121, the ROM 122, the graphic processor 123, the main CPU 124, the first to n-th interface 125-1~125-n may be connected to each other through the bus 126.

The ROM 122 stores a set of instructions for system booting. When a turn-on command is input and thus the power is supplied, the main CPU 124 may copy the O/S stored in the memory 110 to the RAM 121 according to the instructions stored in the ROM 122, and boot the system by executing the O/S. When the booting is completed, the main CPU 124 may copy the various application programs stored in the memory 110 to the RAM 121, and perform various operations by implementing the application programs copied to the RAM 121. Although it has been described that the processor 120 includes one CPU, but in the implementation, a plurality of CPUs (or Digital Signal Processors (DSP), SoC, etc.) may be implemented.

The graphic processor 123 may generate a screen including various objects such as an icon, an image, a text, etc. using a calculator (not illustrated) and a renderer (not illustrated). The calculator may calculate the attribute value such as coordinates, shape, size, and color of each object to be displayed according to the layout of the screen. The renderer may generate screens of various layouts including objects based on the attribute value calculated in the calculator. The screens generated in the renderer may be displayed in a display area of the display 150.

The first to n-the interface 125-1 to 125-n are connected to the above described various configurations. One of the interfaces may be a network interface connected to an image providing apparatus through a network.

For example, the main CPU 124 may copy the image analysis module stored in the memory 110 to the RAM 121 and execute the image analysis module. According thereto, the main CPU 124 may analyze the image received from the image providing apparatus 200 and obtain the apparatus information of the image providing apparatus 200.

The processor 120 may analyze the waveform of an Infra-Red (IR) signal received by an IR sniffing and specify the IR signal. In addition, the processor 120 may analyze the image received through the communicator 130, detect the change of the image corresponding to the IR signal, grasp the type of the detected change of the image, and determine a control command corresponding to the IR signal. In addition, the determined control command and the apparatus information corresponding to the IR signal may be obtained as the apparatus information of the image providing apparatus 200.

The light receiver 140 receives a light signal such as the IR signal through a skylight (not illustrated). The IR signal received through the light receiver 140 may be a signal for controlling the electronic apparatus 100 or a signal for controlling another apparatus which is received by the IR sniffing.

The display 150 is a configuration for displaying various screens by a control of the processor 120.

The display 150 may be implemented as, for example, a Liquid Crystal Display (LCD), and according to a circumstance, may be implemented as a cathode-ray tube (CRT), a plasma display panel (PDP), an organic light emitting diodes (OLED), a transparent OLED (TOLED) and the like. In addition, the display 150 may be implemented in a form of touch screen which may sense a touch operation of a user.

The display 150 may display the image provided from the image providing apparatus 200. In addition, the display 150 may display various pre-stored UI screens.

In this case, the display 150 may be a configuration included in the electronic apparatus 100. The processor 120 may control the display 150 to display the information on the processing state of a voice recognition on the display 150 included in the electronic apparatus 100.

Meanwhile, the electronic apparatus 100 according to another embodiment may not include the display and may be connected to an additional display apparatus. In this case, the processor 120 may control the communicator 130 in order to transmit video and audio signals to the additional display apparatus.

The electronic apparatus 100 according to another embodiment may be connected to an additional display apparatus without including the display 150. In this case, the display apparatus may be connected to the electronic apparatus 100 and receive the video and audio signals. The display apparatus may include a display and an audio ouputter so that the video and audio signals are received and output. The audio outputter may include a speaker, a headphone, an output terminal, or a Sony/Philips Digital Interface (S/PDIF) output terminal for outputting audio data.

In this case, the electronic apparatus 100 may include an output port for transmitting the video and audio signals to the display apparatus. Here, the output port of the electronic apparatus 100 may be a port that may transmit the video and audio signals at the same time. For example, the output port may be one interface among an HDMI, a Display Port (DP), and a Thunderbolt.

Meanwhile, the output port of the electronic apparatus 100 may be composed as an additional port so that the video and audio signals are transmitted respectively.

In addition, the electronic apparatus 100 may use a wireless communication module for transmitting the video and audio signals to the display apparatus. The wireless communication module is a module that performs communication by being connected to an external network according to the wireless communication protocol such as a Wi-Fi, IEEE, etc. In addition, the wireless communication module may further include the mobile communication module that accesses a mobile network and performs communication according to various mobile communication standards such as a 3G, a 3GPP, an LTE, an LTE-A.

The signal processor 160 may include an audio processor 161 and a video processor 162.

The audio processor 161 is an element that processes audio data. The audio processor 161 may perform various processing with respect to audio data, such as decoding, amplification, noise filtering, etc.

The video processor 162 is an element that processes image data received from the communicator 130. The video processor 162 may perform various image processing such as decoding, scaling, noise filtering, frame rate converting, and resolution converting of image data.

The microphone 170 may receive a voice input. The microphone may include various elements such as a microphone which collects a user voice in an analog form, an amplification circuit which amplifies the collected user voice, and an analog-to-digital (A/D) converting circuit which performs sampling on the amplified user voice and converts the voice to a digital signal, and a filter circuit which removes a noise element from the converted digital signal.

The microphone 170 may receive a user's voice in an activation state. For example, the microphone 170 may be implemented as an all-in-one type by being integrated at an upper portion, a front portion, and a side portion. The microphone 170 may receive a voice input. The microphone 170 may include various elements such as a microphone 170 which collects an analog form of a user voice, an amplification circuit which amplifies the collected user voice, and an A/D converting circuit which performs sampling on the amplified user voice and converts the voice to a digital signal, and a filter circuit which removes a noise element from the converted digital signal.

Here, a type, a size, a disposition location, etc. of the microphone 170 may vary according to the type of the operation to be implemented by using a remote controller, an outer shape of the remote controller, or a using aspect of the remote controller. For example, if the remote controller is implemented as a hexahedron of which front side is in a rectangular form, the microphone 170 may be disposed at the front of the remote controller.

The user may perform voice recognition through the microphone 170 of the electronic apparatus. Accordingly, all operation of the disclosure may be performed only by the microphone 170 of the electronic apparatus without a microphone included in an external apparatus.

The audio outputter 180 may include a speaker 181, a headphones output terminal 182, or an S/PDIF output terminal 183 for outputting the audio data processed by the audio processor 161.

An operation inputter 190 may be implemented to be a button, a touch pad, a mouse and a keyboard, or may be implemented to be a touch screen that can also perform a display function and an operation input function.

Meanwhile, various embodiments described above may be implemented in a recording medium that may be read by a computer or a similar apparatus to the computer by using software, hardware, or a combination thereof. According to the hardware embodiment, embodiments that are described in the disclosure may be implemented by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. In some cases, embodiments that are described in the disclosure may be embodied as the processor 120 itself. In a software embodiment, various embodiments described in the disclosure such as a procedure and a function may be implemented as separate software modules. The software modules may respectively perform one or more functions and operations described in the embodiments.

In the above description, it has been described that the electronic apparatus 100 directly includes the microphone, but according to another embodiment, the microphone may be the element included in an external apparatus.

In this case, if the microphone included in the external apparatus receives an analogue voice signal, the analogue voice signal received from the external apparatus may be converted into a digital signal. In addition, the external apparatus may transmit the converted digital signal to the electronic apparatus 100. In addition, the external apparatus may use a wireless communication method for transmitting the converted digital signal to the electronic apparatus 100, and the wireless communication method may be a Bluetooth or Wi-Fi. In addition, the wireless communication method has been described as a Bluetooth or Wi-Fi, but in the implementation, various wireless communication methods may be used in addition to the Bluetooth or Wi-Fi.

The external apparatus may be a remote controller apparatus. The remote control apparatus corresponds to the apparatus for controlling a specific apparatus, and may correspond to a remote controller, and a user may perform a voice recognition operation through the microphone attached to the remote controller.

Meanwhile, the external apparatus may correspond to the terminal apparatus such as a smartphone. A user may perform a voice recognition operation through the microphone included in the smartphone. In this case, the user may perform the voice recognition operation by installing a specific application in the smartphone and transmit the voice recognition result to the electronic apparatus 100. In addition, the user may control the electronic apparatus 100 using the specific application.

In this case, the smartphone including the microphone may include a communicator that uses Bluetooth, Wi-Fi, or infrared for controlling the electronic apparatus 100. In this case, the communicator of the external apparatus may be composed of a plurality of elements according to a communication method.

Meanwhile, the external apparatus including a microphone may include a communicator that uses Bluetooth, Wi-Fi, or infrared for controlling the electronic apparatus 100 and for transmitting or receiving data. In this case, the communicator of the external apparatus may be composed of a plurality of elements according to a communication method.

In addition, the electronic apparatus 100 that receives data or a control command from the external apparatus or transmit data to the external apparatus may include the communicator 130 that uses Bluetooth, Wi-Fi, or infrared. In this case, the communicator 130 of the electronic apparatus 100 may be composed of a plurality of elements according to a communication method.

Figure 3:
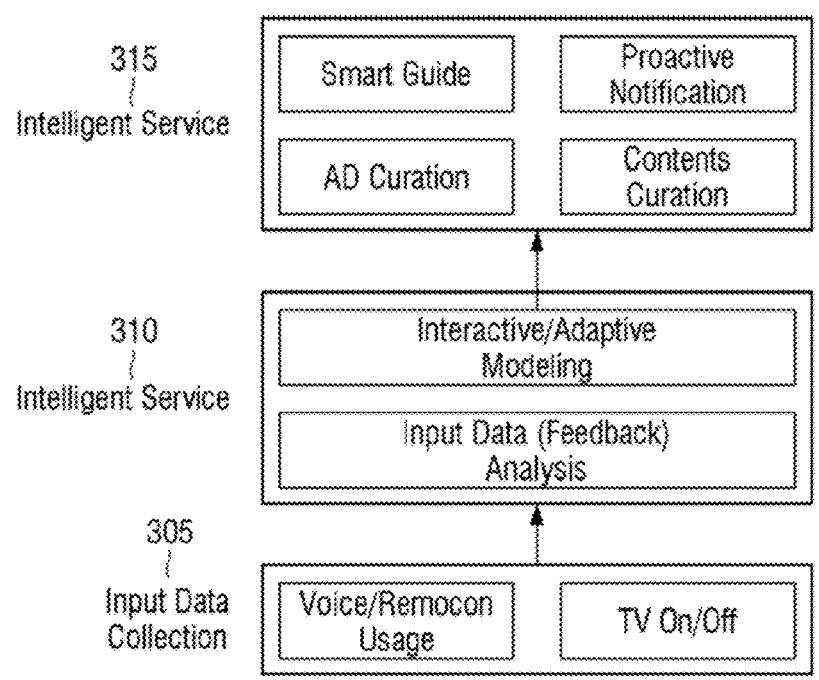
FIG. 3 is a system diagram illustrating an electronic apparatus according to an embodiment of the disclosure.

FIG. 3 is a system diagram illustrating an electronic apparatus according to an embodiment.

An input data collection 305 may include whether an input apparatus (a voice, or a remote controller) is used or whether a power of a TV is on/off. Specifically, whether a user turned on/off a TV through an input apparatus (a voice, or a remote controller) may be determined.

In addition, the Intelligence Engine(service) 310 may analyze the collected input data and according to the analysis result, an interactive modeling or an adaptive modeling may be reflected to the input data.

In addition, based on the result to which the above described modeling is reflected, the intelligent service 315 may be performed. Here, the service may include a guide display, a pop-up informing display, an advertisement curation, a content curation, and the like.

FIG. 4 is a view illustrating a selection of a user.

Figure 4A:
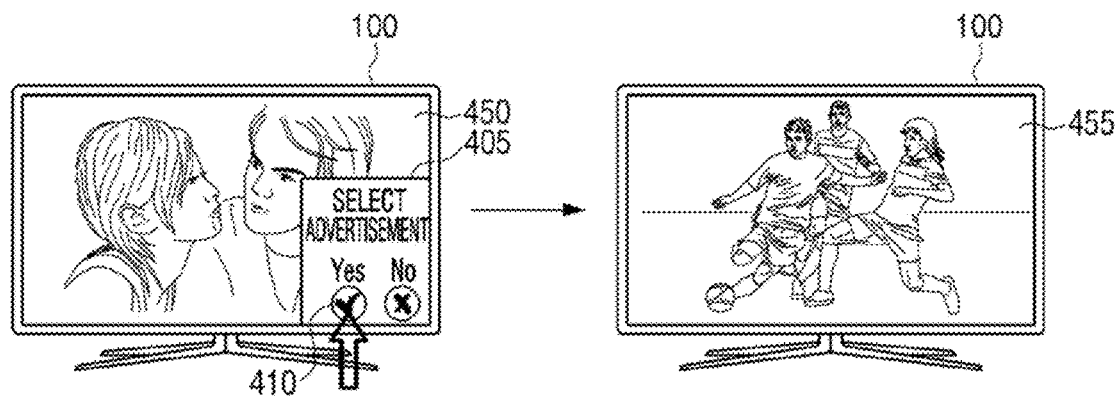
FIGS. 4A, 4B, and 4C are a view illustrating a selection of a user.

Referring to FIG. 4A, if a specific screen 450 is provided in the electronic apparatus 100, the electronic apparatus 100 may provide a pop-up content 405. If a user wishes to use the pop-up content, the user may select a Yes button 410 and then the electronic apparatus 100 may convert the screen to a new screen 455. The new screen 455 may include the information related to the pop-up content 405.

Figure 4B:
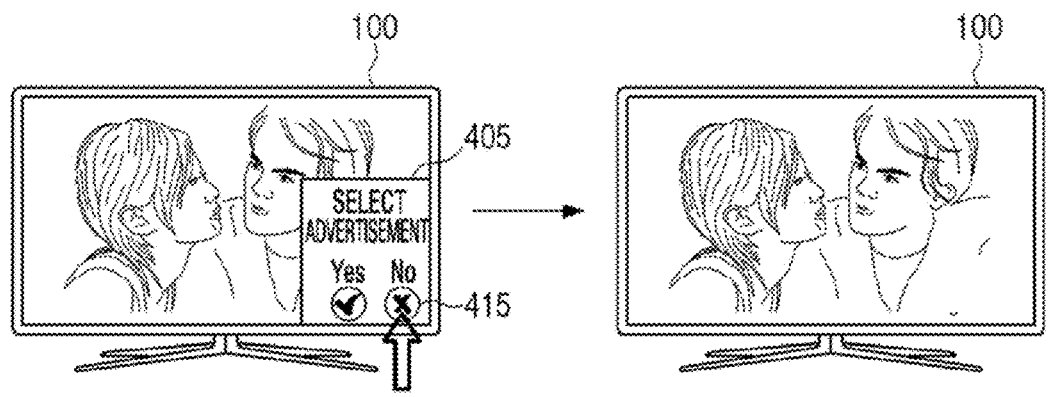

Referring to FIG. 4B, if a user clicks No button 415 regarding the pop-up content 405, the electronic apparatus 100 may control to remove the pop-up content 405.

Figure 4C:
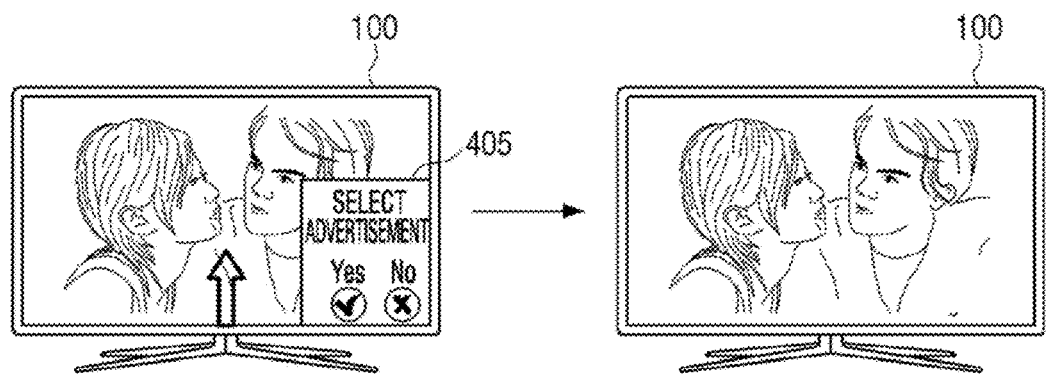

Referring to FIG. 4C, if a user does not respond to the pop-up content 405, the electronic apparatus 100 may control to remove the pop-up content after a predetermined time passes. In addition, in FIG. 4C, the case in which there is no response for ten seconds has been described, but it is merely for a description and ten seconds can be changed by a user's setting.

In addition, in the case of FIG. 4A, the electronic apparatus 100 may identify that a user selects the pop-up content and in the cases of FIG. 4B and FIG. 4C, the electronic apparatus may identify that the user does not select the pop-up content.

FIG. 5 is a view illustrating a process for storing usage state information regarding a content according to an embodiment.

Referring to FIG. 5A, the process that a user selects a pop-up content and a specific screen is converted into a new screen, and the time information of each process may be stored. In this case, the electronic apparatus 100 may store the information on whether the pop-up content is selected, in the memory 120.

Specifically, as illustrated in FIG. 5B, the electronic apparatus 100 may store the time point when the pop-up content is provided, the time point when a user selects the pop-up content, and the result value regarding whether the pop-up content is selected, in the memory 120. In addition, the stored data may be included in the usage state information. Meanwhile, the process for combining the usage state information, performing grouping, and predicting or determining the usage pattern of the user will be described below.

FIG. 6 is a view illustrating a process for performing grouping according to an embodiment.

Figure 6A:
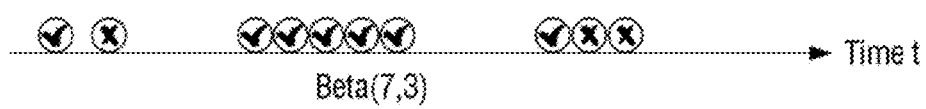
FIGS. 6A and 6B are a view illustrating a process for performing grouping according to an embodiment of the disclosure.

Referring to FIG. 6A, user's selections regarding a general pop-up content are displayed based on a time, and the case where the user selects the pop-up content for seven times and does not select the pop-up content for three times is supposed. The electronic apparatus 100 may use a Thompson Sampling by using the information on (selection, non-selection)=(7, 3) which is the result value of whether the pop-up content is selected. The detailed description regarding the method for using the Thompson Sampling will be described with reference to FIG. 7 and FIG. 8.

Figure 6B:
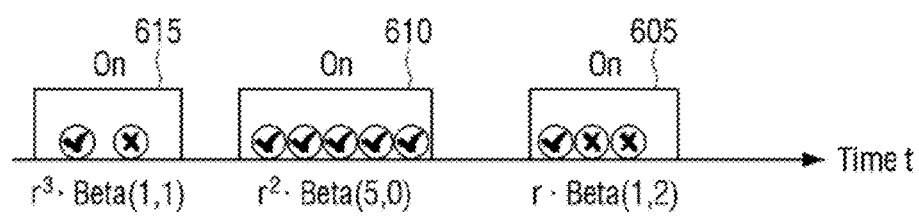

Referring FIG. 6B, the electronic apparatus 100 may divide the interval of the time based on a certain standard. In this case, the electronic apparatus 100 according to an embodiment assumes user's interaction as a turn on/off operation of the electronic apparatus 100. If a user recently turns on the electronic apparatus 100 for three times, the electronic apparatus 100 may group the usage state information as a new group every time when the electronic apparatus 100 is turned on.

Referring to FIG. 6B, three pieces of usage state information are included in the first group 605, five pieces of usage state information are included in the second group 610, and two pieces of usage state information are included in the third group 615. In this case, the electronic apparatus 100 may apply different weighted values to each group. For example, weighted value r may be applied to the first group, weighted value r^2 may be applied to the second group, and weighted value r^3 may be applied to the third group. In this case, r may be the number greater than 0 and smaller than 1.

In addition, the electronic apparatus 100 may combine the values of each group to which each weighted value is applied. For example, r*Beta(1,2) calculated in the first group, r^2*Beta(5,0) calculated in the second group, and r^3*Beta(1,1) calculated in the third group may be combined. That is, the electronic apparatus 100 may calculate Beta(1*r^3+5*r^2+1*r, 1*r^3+0*r^2+2*r) as a final value, and the user's usage pattern may be predicted or determined by using the calculated value. In this case, in order to use the beta distribution and the Thompson Sampling, if the result value is calculated, the result value may become an integer by using one of rounding up, rounding down, and rounding off for removing a decimal point. For example, if it is assumed that r is 0.5, in the above example, the final form for (selection, non-selection) may be (1.875, 1.125). In this case, the electronic apparatus 100 may round off the result value so as to become an integer for using the beta distribution and the Thompson Sampling. That is, the electronic apparatus 100 may convert (1.875, 1.125) to (2, 1). In addition, the electronic apparatus 100 may use the beta distribution and the Thompson Sampling for (2, 1).

The detailed beta distribution and the Thompson Sampling will be described with reference to FIG. 7 and FIG. 8.

Referring to FIG. 6B, a relatively high weighted value may be applied to the usage state information which is stored the most recently, and the electronic apparatus 100 may reflect the recent usage history more, so as to predict or determine the usage pattern of the user accurately.

Figure 7:
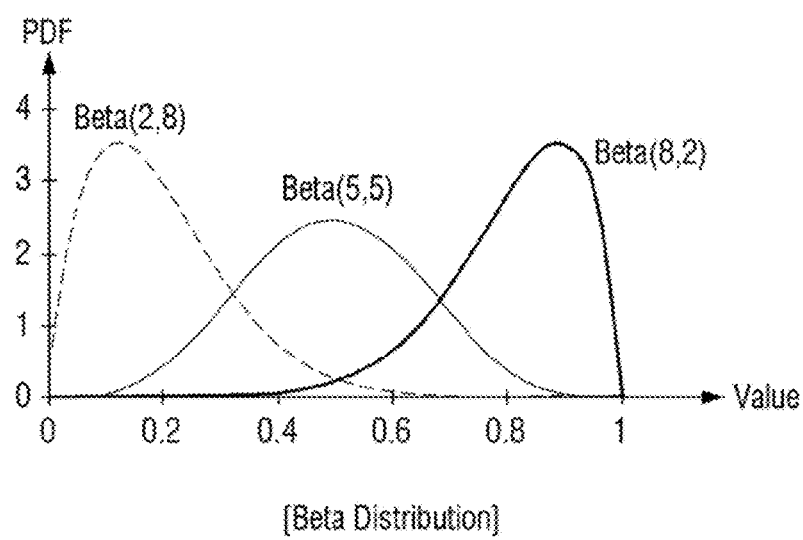
FIG. 7 is a view illustrating a general beta distribution.

FIG. 7 is a view illustrating a beta distribution.

Referring to FIG. 7, the processor 120 may store the data regarding whether a pop-up content is selected and use the beta distribution for the data. The beta distribution may be a continuous probability distribution defined in [0.1] section according to two parameters. PDF means Probability Density Function and x axis may be a value between 0 and 1.

Referring to FIG. 7, two parameters may be used as the number of selection on a pop-up content and as the number of non-selection on the pop-up content. The number of selection on the pop-up content may be the value that whether a user selected a pop-up content is counted. In addition, the number of non-selection on a pop-up content may be the number of the case in which when the corresponding pop-up content is provided, a user closes the pop-up content or does not respond.

Referring to FIG. 7, the beta distribution regarding Beta (the number of selection on the pop-up content, and the number of non-selection on the pop-up content) is illustrated. The processor 120 may analyze the beta distribution and determine whether to provide the pop-up content to a user. Specifically, Beta (2, 8) may be the beta distribution regarding the pop-up content of which the number of selection is 2 and the number of non-selection is 8, and Beta (5, 5) may be the beta distribution regarding the pop-up content of which the number of selection is 5 and the number of non-selection is 5, and Beta (8, 2) may be the beta distribution regarding the pop-up content of which the number of selection is 8 and the number of non-selection is 2.

Figure 8:
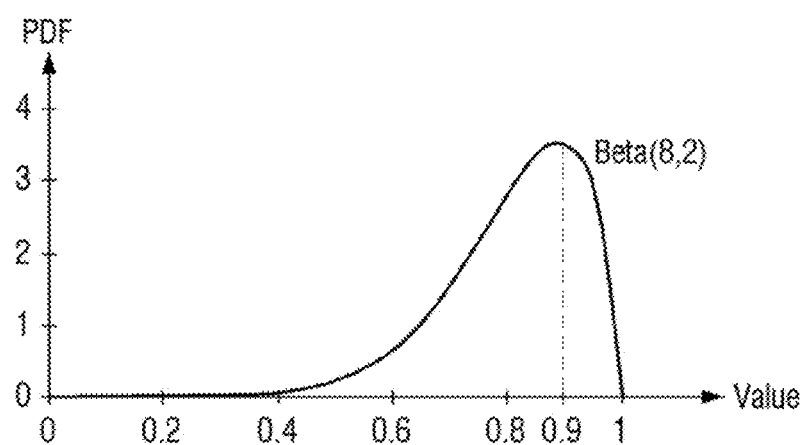
FIG. 8 is a view illustrating a process for predicting or determining a usage pattern of a user according to an embodiment of the disclosure.

FIG. 8 is a view illustrating a process for predicting or determining a usage pattern of a user according to an embodiment.

Referring to FIG. 8, the beta distribution of the case in which the number of selection on the pop-up content is 8 and the number of non-selection on the pop-up content is 2, may be confirmed. The processor 120 may confirm the position having the highest value of y axis in the beta distribution, and calculate the value of x axis of the point having the highest value of y axis. In the case of FIG. 8, the value may be 0.9. The processor 120 may determine the x value obtained by the above described method as the value regarding whether the pop-up content is selected, and if the value is equal to or greater than a predetermined value, it may be determined that the corresponding pop-up content is a preferred pop-up content.

For example, suppose that only when the value regarding whether the pop-up content is selected is equal to or greater than 0.6, the processor 120 identifies the pop-up content as a preferred pop-up content. The processor 120 may determine the value regarding whether the pop-up content is selected for the pop-up content corresponding to Beta (8, 2) as 0.9, and determine that the pop-up content corresponding to Beta (8, 2) as the pop-up content preferred by a user. Meanwhile, with regard to using the beta distribution, the Thomson sampling may be used.

FIG. 9 is a view illustrating interaction information according to various embodiments.

The user interaction information may correspond to one operation of a user for manipulating the electronic apparatus 100.

Specifically, the user interaction information may include at least one of a user interaction for turning on/off the electronic apparatus 100, a user interaction for selecting a specific menu, a user interaction for pressing a predetermined button or a user interaction for inputting a voice command. The above example is merely for describing the user interaction, and does not limit the type of the user interaction in the embodiment.

The user interaction information may mean a specific operation of a user for manipulating the electronic apparatus 100. In this case, the user may set the operation for turning on/off the electronic apparatus 100 as the user interaction.

The electronic apparatus 100 may divide the time section based on at least one of a time point when the user interaction is input or a time point when the user interaction is terminated.

Figure 9A:
FIGS. 9A, 9B, 9C, and 9D are a view illustrating interaction information according to various embodiments of the disclosure.

Referring to FIG. 9A, the electronic apparatus 100 may divide the section from the time point when the user turns on the electronic apparatus 100 to the time point when the user turns off the electronic apparatus 100, as one time section.

Figure 9B:
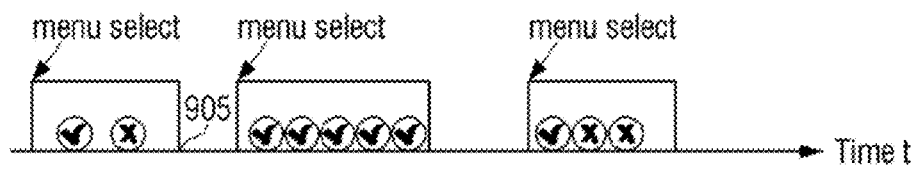

Referring to FIG. 9B, the electronic apparatus 100 may divide the section from the time point when a user selects a specific menu to the time point 905 when the user exits from the specific menu, as one time section.

Figure 9C:
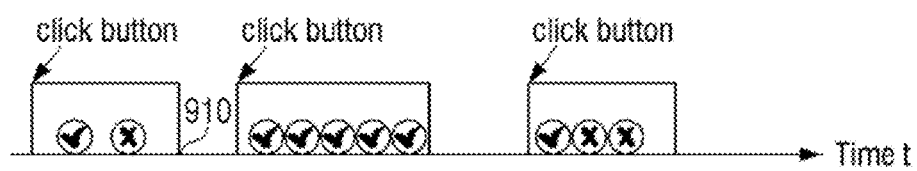

Also, referring to FIG. 9C, the electronic apparatus 100 may divide the section from the time point when a user presses a predetermine button to the time point 910 when the user presses the predetermine button again, as one time section.

Figure 9D:
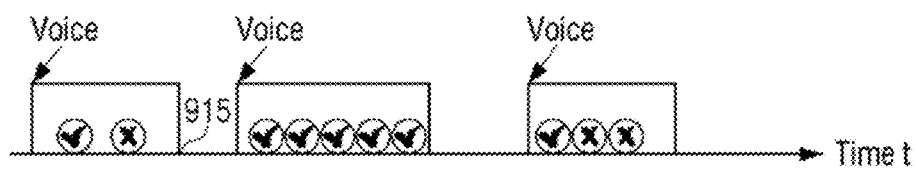

In addition, referring to FIG. 9D, the electronic apparatus 100 may divide the section from the time point when a user inputs a predetermined voice command to the time point 915 when the user inputs a predetermined voice command again, as one time section.

In this case, the operation of dividing the user interaction described above is merely for a description, and in the implementation, the user interaction may be divided in various methods. For example, from the time point when a user turns on the electronic apparatus 100 to the time point when the user presses a predetermined button, may be divided as one time section, and the sections may be combined variously.

In addition, the starting point that specifies the time section is set as the time point when the user interaction is performed, but the ending point 905, 910, and 915 may be limited to the case in which a predetermined time passes. For example, from the time point when a user selects a specific menu to the time point when ten minutes passes may be divided as one time section. In the above description, from the time point when a specific menu is selected to the time point when ten minutes passes is described as one section, but various user interactions in addition to the specific menu may be set and the time of ten minutes may vary according to the setting of a user.

FIG. 10 is a view illustrating a process for predicting or determining a usage pattern of each user according to another embodiment.

Figures 10A, 10B:
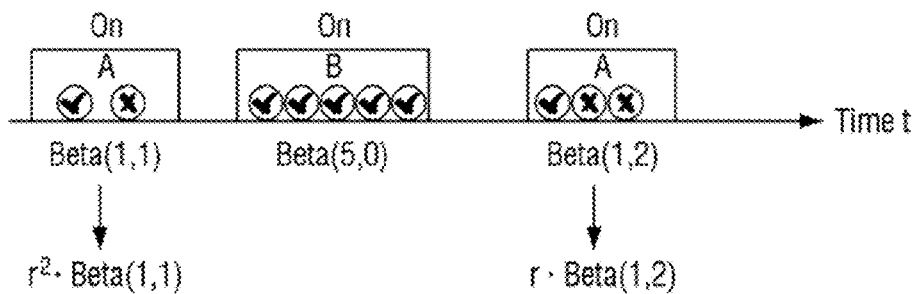
FIGS. 10A and 10B are a view illustrating a process for predicting or determining a usage pattern of each user according to another embodiment of the disclosure.

Referring to FIG. 10A, the usage state information may include the information for identifying a user. In FIG. 10A, the users are divided into A and B, and the electronic apparatus 100 may divide the users and predict or determine each user's usage pattern.

Specifically, referring to FIG. 10B, if the subject who uses the electronic apparatus 100 is A, the electronic apparatus 100 may calculate the user's usage pattern by using only the usage state information regarding A. In this case, each weighted value may be applied only to A.

In this case, the electronic apparatus 100 may finally calculate the prediction of the user's usage pattern regarding A as Beta($1*r^2+1*r, 1*r^2+2*r$). In addition, the electronic apparatus 10 may predict or determine the user's usage pattern by a type of pop-up, in addition to predicting or determining by a user.

FIG. 11 is a view illustrating a process for predicting or determining a usage pattern of each type of pop-up according to another embodiment.

Referring to FIG. 11, the pop-up content may include at least one of a recommended pop-up content or an advertisement pop-up content.

The pop-up content may be a content asking a user whether to select a specific advertisement, or may be a content recommending a specific content. For example, the pop-up content may be a content for confirming whether to purchase a product shown in a specific advertisement or a content for moving the current page to the page informing detailed information on the specific advertisement, when a user is watching the corresponding advertisement. In addition, the pop-up content may be a content for recommending a specific content by analyzing the viewing history of the user.

The electronic apparatus 100 may predict or determine the usage pattern for each type of pop-up content based on the information on the each type of pop-up content. For example, if a pop-up content is regarding an advertisement, the electronic apparatus 100 may group the usage state information for each pop-up content regarding the advertisement and predict or determine the user's usage pattern.

Figures 11A, 11B:
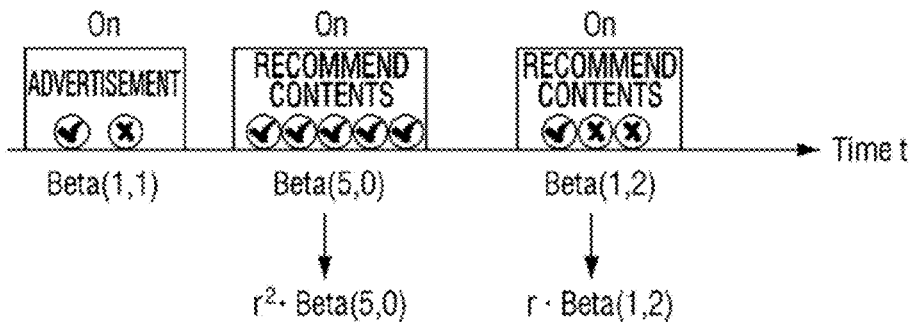
FIGS. 11A and 11B are a view illustrating a process for predicting or determining a usage pattern of each type of pop-up according to another embodiment of the disclosure.

Referring to FIG. 11A, the usage state information may include the information on the type of pop-up content.

Referring to FIG. 11B, the electronic apparatus 100 may analyze only regarding the pop-up content recommending a specific content among the types of pop-up content. In this case, the electronic apparatus 100 may predict or determine the usage pattern of a user by using only the usage state information on the pop-up content that recommends a content.

In this case, the electronic apparatus 100 may finally calculate the prediction of the user's usage pattern only for the pop-up content that recommends a specific content among the types of pop-up content as $Beta(1*r^2+1*r, 1*r^2+2*r)$.

Meanwhile, the electronic apparatus 100 may identify a user based on user's usage history information.

FIG. 12 is a view illustrating an operation for identifying a user by using a viewing time and a genre pattern of a content of a user.

Referring to FIG. 12, the electronic apparatus 100 may store the viewing history information on that a user uses the electronic apparatus 100 for each day of the week. In addition, the electronic apparatus 100 may identify a user based on the viewing history information.

Specifically, the electronic apparatus 100 may identify a user by combining a viewing time point and a content genre included in the viewing history information. For example, the electronic apparatus 100 may analyze the pattern that a user repeatedly watches a weather content at 0:00 AM, and determine the user as a specific user A. In addition, as shown in 2017-12-15, if a user watches a drama at 0:00 AM, not the weather content, the electronic apparatus 100 may determine the user as another user, not the specific user A.

In addition, the electronic apparatus 100 may identify a user by dividing a weekday and a weekend. For example, since the content repeatedly watched on weekdays is not watched on a weekend and movie contents are mostly watched on the weekend, the electronic apparatus 100 may identify the user who watches the movie contents on the weekend as user B.

The above description is for a specific description, and the electronic apparatus 100 may identify a user through various analysis methods. Various analysis methods may be applied based on usage history information, and the electronic apparatus 100 may predict or determine the usage pattern for each user by identifying the user.

FIG. 13 is a view illustrating an operation for analyzing content history information of an electronic apparatus.

Figure 13A:
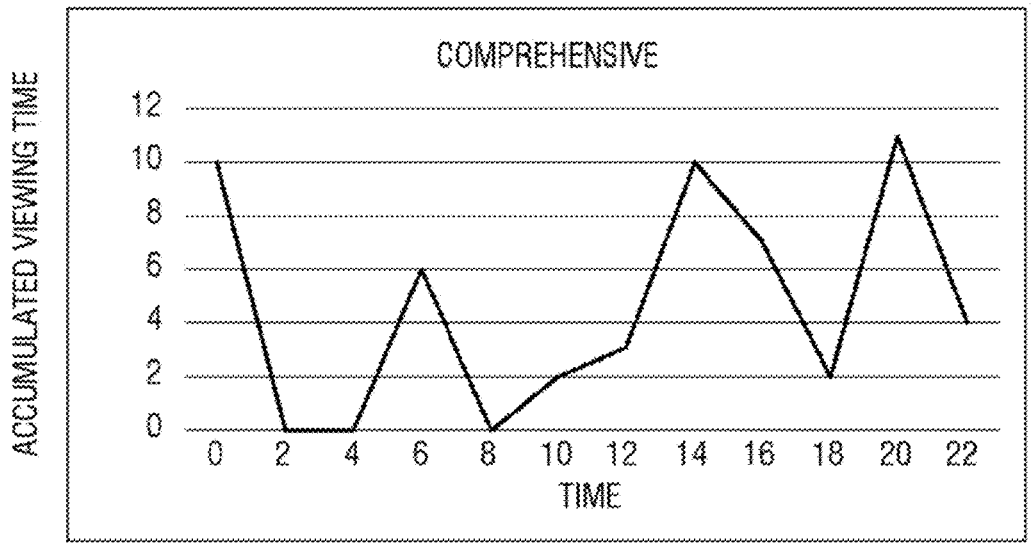
FIGS. 13A and 13B are a view illustrating an operation for analyzing content history information of an electronic apparatus.

In FIG. 13, it is supposed that all users are the same. Referring to FIG. 13A, the electronic apparatus 100 may analyze viewing history information without dividing a weekday and a weekend. The electronic apparatus 100 may combine the viewing accumulative time and identify in which time zone a user uses the electronic apparatus 100. Referring to FIG. 13A, the electronic apparatus 100 may analyze that user's usage time value is high before and after 0:00 AM, 6:00 AM, 14:00 PM, and 20:00 PM. If the similar viewing pattern is identified after then, the electronic apparatus 100 may determine the user as the same user.

Figure 13B:
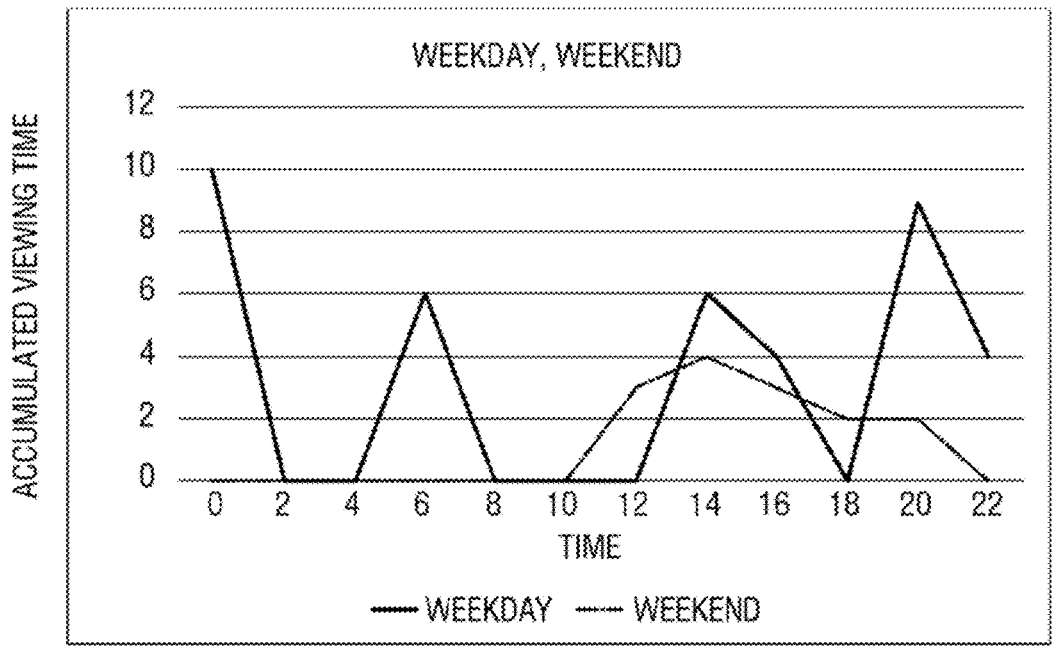

Meanwhile, referring to FIG. 13B, the electronic apparatus 100 may analyze viewing history information by dividing a weekday and a weekend. Since the viewing history pattern of a weekday is different from that of a weekend, the electronic apparatus 100 may determine the viewing history patterns of a weekday and a weekend separately. Since the viewing pattern of a weekday is divided from that of a weekend, it may be effective that the electronic apparatus 100 analyzes the viewing history by dividing a weekday and a weekend. That is, the electronic apparatus 100 may predict or determine the usage pattern of a user by dividing a weekday and a weekend.

Figure 14:
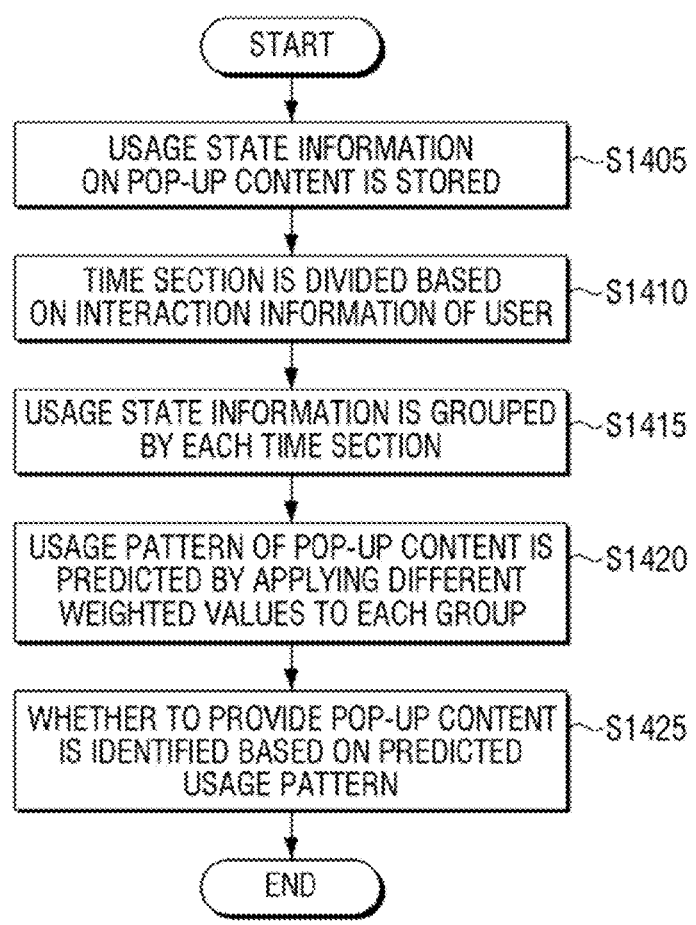
FIG. 14 is a flowchart illustrating a method for controlling an electronic apparatus according to an embodiment of the disclosure.

FIG. 14 is a flowchart illustrating a method for controlling an electronic apparatus according to an embodiment.

The controlling method of the electronic apparatus 100 according to an embodiment may include storing usage state information on a pop-up content in S1405.

In this case, the usage state information may include at least one of the information on whether the pop-up content is selected or the information on a time from a time point when the pop-up content is provided to a time point when whether the pop-up content is selected is identified.

Meanwhile, dividing a time section based on interaction information of a user regarding the electronic apparatus 100 may be included in S1410.

In addition, the interaction information may include at least one of a user interaction for turning on/off the electronic apparatus 100, a user interaction for selecting a specific menu, a user interaction for pressing a predetermined button or a user interaction for inputting a voice command, and the dividing a time section may include dividing the time section based on at least one of a time point when the user interaction is input or a time point when the user interaction is terminated.

The controlling method of the electronic apparatus 100 according to an embodiment may include grouping usage state information into a time section in S1415.

The controlling method of the electronic apparatus 100 according to an embodiment may include predicting or determining a usage pattern regarding a pop-up content by applying different weighted values to each group in S1420.

In this case, the predicting or determining the usage pattern regarding a pop-up content may include applying a relatively high weighted value to the usage state information included in the group corresponding to a time section nearest to a present time point.

In addition, the predicting or determining the usage pattern regarding a pop-up content may include grouping usage state information selected based on the user information from the stored usage state information, by the each time section.

The predicting or determining the usage pattern regarding a pop-up content may include identifying a user who uses the electronic apparatus 100 based on at least one of a repeating pattern of a viewing time or a genre pattern of a viewing content, and predicting or determining a usage pattern of each user based on interaction information of each user who is identified.

The pop-up content may include at least one of a recommended pop-up content or an advertisement pop-up content, and the predicting or determining a usage pattern regarding a pop-up content may include predicting or determining a usage pattern for each type of the pop-up content based on information for each type of the pop-up content.

In this case, the pop-up content may be a recommended pop-up content, and the predicting or determining the usage pattern regarding a pop-up content may include predicting or determining a usage pattern of each recommended target of the pop-up content based on the information on a recommended target of the recommended pop-up content.

In addition, the predicting or determining the usage pattern regarding a pop-up content may include predicting or determining the usage pattern by combining usage state information on each group to which the different weighted value is applied, by each usage state.

Meanwhile, the controlling method of the electronic apparatus 100 according to an embodiment may include identifying whether to provide the pop-up content based on the predicted or determined usage pattern in S1425.

According to an embodiment, there is provided a computer readable recording medium which includes a program to execute a method for controlling the electronic apparatus 100, wherein the controlling method includes storing usage state information on a pop-up content, dividing a time section based on interaction information of a user regarding the electronic apparatus 100, grouping the usage state information by each time section and predicting or determining a usage pattern regarding a pop-up content by applying different weighted values to each group, and identifying whether to provide the pop-up content based on the predicted or determined usage pattern.

The methods according to the above-described various embodiments may be realized as software or applications that may be installed in the existing electronic apparatus.

Further, the methods according to the above-described various embodiments may be realized by upgrading the software or hardware of the existing electronic apparatus.

The above-described various embodiments may be executed through an embedded server in the electronic apparatus or through an external server outside the electronic apparatus.

The method for controlling an electronic apparatus according to the above-described various embodiments may be realized as a program and provided in the electronic apparatus. In particular, the program including a method for controlling an electronic apparatus may be stored in a non-transitory computer readable medium and provided therein.

Various embodiments described above may be implemented in a recording medium that may be read by a computer or a similar apparatus to the computer by using software, hardware, or a combination thereof. According to the hardware embodiment, embodiments that are described in the disclosure may be implemented by using at least one selected from ASICs, DSPs, DSPDs, PLDs, FPGAs, processors, controllers, micro-controllers, microprocessors, electrical units for performing other functions. In some cases, embodiments that are described in the disclosure may be embodied as the processor 120 itself. In a software embodiment, various embodiments described in the disclosure such as a procedure and a function may be implemented as separate software modules. The software modules may respectively perform one or more functions and operations described in the embodiments.

Meanwhile, the computer instructions for performing a process operation in the electronic apparatus according to various embodiments described above may be stored in a non-transitory computer-readable medium. If the computer instructions stored in the non-transitory computer-readable medium is executed by the processor of a specific apparatus, the computer instructions cause the specific apparatus to perform the process operation in the electronic apparatus according to various embodiments described above.

The non-transitory computer-readable medium is not a medium that stores data for a short moment such as a register, a cash and a memory and the like, but a medium that stores data semi-permanently and which is readable by an apparatus. The specific examples of the non-transitory computer-readable medium may be CD, DVD, a hard disc, Blu-ray disc, USB, a memory card, ROM, or the like.

Although various embodiments of the disclosure have been illustrated and described hereinabove, the disclosure is not limited to the above-mentioned embodiments, but may be variously modified by those skilled in the art to which the disclosure pertains without departing from the scope and spirit of the disclosure as set forth in the accompanying claims. These modifications should also be understood to fall within the scope of the disclosure.

What is claimed is:

1. An electronic apparatus comprising:
   a memory configured to store usage state information including information on whether a pop-up content is selected; and
   a processor configured to:
      divide a period which a plurality of interaction information of a user are identified, into time sections based on interaction information of a user for manipulating the electronic apparatus,
      group the usage state information stored in the memory by each time section,
      identify a usage pattern regarding the pop-up content by applying a different weighted value to each group, and
      identify whether to provide the pop-up content based on the determined usage pattern.

2. The electronic apparatus as claimed in claim 1, wherein the processor applies a high weighted value to the usage state information included in a group corresponding to a time section nearest to a present time point.

3. The electronic apparatus as claimed in claim 1, wherein the usage state information includes information on a time from a time point when the pop-up content is provided to a time point when whether the pop-up content is selected is identified.

4. The electronic apparatus as claimed in claim 1, wherein the interaction information includes at least one of a user interaction for turning on/off the electronic apparatus, a user interaction for selecting a specific menu, a user interaction for pressing a predetermined button or a user interaction for inputting a voice command, and
   wherein the processor divides the period into the time sections based on at least one of a time point when the user interaction is input or a time point when the user interaction is terminated.

5. The electronic apparatus as claimed in claim 1, wherein the processor identifies a user who uses the electronic apparatus based on at least one of a repeating pattern of a viewing time or a genre pattern of a viewing content, and identifies a usage pattern of each user based on interaction information of each user who is identified.

6. The electronic apparatus as claimed in claim 1, wherein the pop-up content includes at least one of a recommended pop-up content or an advertisement pop-up content, and
wherein the processor identifies a usage pattern for each type of the pop-up content based on information for each type of the pop-up content.

7. The electronic apparatus as claimed in claim 1, wherein the pop-up content is a recommended pop-up content, and
wherein the processor identifies a usage pattern of each recommended target of the pop-up content based on information on a recommended target of the recommended pop-up content.

8. The electronic apparatus as claimed in claim 1, wherein the processor identifies the usage pattern by combining usage state information on each group to which the different weighted value is applied.

9. The electronic apparatus as claimed in claim 4, wherein the processor groups usage state information selected based on user information from the usage state information stored in the memory, by the each time section.

10. A controlling method of an electronic apparatus, comprising:
storing usage state information including information on whether a pop-up content is selected;
dividing a period which a plurality of interaction information of a user are identified, into time sections based on interaction information of a user for manipulating the electronic apparatus;
grouping the usage state information by each time section, and determining a usage pattern regarding the pop-up content by applying a different weighted value to each group; and
identifying whether to provide the pop-up content based on the determined usage pattern.

11. The method as claimed in claim 10, wherein the determining a usage pattern regarding a pop-up content comprising applying a high weighted value to the usage state information included in a group corresponding to a time section nearest to a present time point.

12. The method as claimed in claim 10, wherein the usage state information includes information on a time from a time point when the pop-up content is provided to a time point when whether the pop-up content is selected is identified.

13. The method as claimed in claim 10, wherein the interaction information includes at least one of a user interaction for turning on/off the electronic apparatus, a user interaction for selecting a specific menu, a user interaction for pressing a predetermined button or a user interaction for inputting a voice command, and
wherein the dividing comprising dividing the period into the time sections based on at least one of a time point when the user interaction is input or a time point when the user interaction is terminated.

14. The method as claimed in claim 10, wherein the determining a usage pattern regarding a pop-up content comprising identifying a user who uses the electronic apparatus based on at least one of a repeating pattern of a viewing time or a genre pattern of a viewing content, and determining a usage pattern of each user based on interaction information of each user who is identified.

15. The method as claimed in claim 10, wherein the pop-up content includes at least one of a recommended pop-up content or an advertisement pop-up content, and
wherein the determining a usage pattern regarding a pop-up content comprising determining a usage pattern for each type of the pop-up content based on information for each type of the pop-up content.

16. The method as claimed in claim 10, wherein the pop-up content is a recommended pop-up content, and
wherein the determining a usage pattern regarding a pop-up content comprising determining a usage pattern of each recommended target of the pop-up content based on information on a recommended target of the recommended pop-up content.

17. The method as claimed in claim 10, wherein the determining a usage pattern regarding a pop-up content comprising determining the usage pattern by combining usage state information on each group to which the different weighted value is applied.

18. The method as claimed in claim 13, wherein the determining a usage pattern regarding a pop-up content comprising grouping usage state information selected based on user information from the stored usage state information, by the each time section.

19. A non-transitory computer readable recording medium which includes a program to execute a method for controlling an electronic apparatus, wherein the controlling method comprises:
storing usage state information including information on whether a pop-up content is selected;
dividing a period which a plurality of interaction information of a user are identified, into the time sections based on interaction information of a user for manipulating the electronic apparatus:
grouping the usage state information by each time section, and determining a usage pattern regarding the pop-up content by applying a different weighted value to each group; and
identifying whether to provide the pop-up content based on the determined usage pattern.

* * * * *